United States Patent [19]

Clark

[11] Patent Number: 6,155,429
[45] Date of Patent: Dec. 5, 2000

[54] PROCESS FOR CENTRIFUGAL SEPARATION OF MATERIAL

[75] Inventor: Thomas Richard Clark, Chattanooga, Tenn.

[73] Assignee: E. I. du Pont de Nemours and Company, Wilmington, Del.

[21] Appl. No.: 09/117,479

[22] PCT Filed: Jan. 22, 1997

[86] PCT No.: PCT/US97/00884

§ 371 Date: Jul. 30, 1998

§ 102(e) Date: Jul. 30, 1998

[87] PCT Pub. No.: WO97/27924

PCT Pub. Date: Aug. 7, 1997

Related U.S. Application Data

[60] Provisional application No. 60/010,942, Jan. 31, 1996.

[51] Int. Cl.$^7$ .................................. B03B 5/28; B03B 1/00
[52] U.S. Cl. ............................... 209/725; 209/3; 209/724
[58] Field of Search ............................ 210/787; 209/727, 209/162, 724, 736, 3

[56] References Cited

U.S. PATENT DOCUMENTS

| | | | |
|---|---|---|---|
| 3,985,650 | 10/1976 | Saitoh et al. .............................. | 210/44 |
| 4,155,839 | 5/1979 | Seifert et al. ............................. | 209/211 |
| 4,279,743 | 7/1981 | Miller ...................................... | 209/211 |
| 4,399,027 | 8/1983 | Miller ...................................... | 209/164 |
| 4,564,443 | 1/1986 | Bliss ........................................ | 209/211 |
| 4,606,822 | 8/1986 | Miller ...................................... | 209/725 |
| 4,744,890 | 5/1988 | Miller et al. ............................. | 209/164 |
| 4,838,434 | 6/1989 | Miller et al. ............................. | 209/725 |
| 4,971,685 | 11/1990 | Stanley et al. ........................... | 209/725 |
| 4,997,549 | 3/1991 | Artwood ................................. | 209/725 |
| 5,192,423 | 3/1993 | Duczmal et al. ........................ | 209/725 |
| 5,387,342 | 7/1995 | Rogers et al. ........................ | 210/512.3 |
| 5,397,066 | 3/1995 | Leitman et al. ........................... | 209/3 |
| 5,464,536 | 11/1995 | Rogers ................................. | 210/380.1 |
| 5,466,385 | 11/1995 | Rogers et al. ........................... | 210/787 |
| 5,667,151 | 9/1997 | Miura et al. .............................. | 241/20 |
| 5,770,050 | 6/1998 | Trefz et al. .............................. | 209/725 |
| 5,855,769 | 1/1999 | Firth et al. ............................... | 209/164 |

*Primary Examiner*—Donald P. Walsh
*Assistant Examiner*—Daniel Schlak

[57] ABSTRACT

This invention relates to a process for centrifugal separation of polyamide and polypropylene materials contained in a liquid slurry. The polypropylene material has a specific gravity which is less than the specific gravity of the liquid carrier and the polyamide material has a specific gravity which is greater than the specific gravity of the liquid carrier. A gas, preferably air, is injected into the slurry prior to feeding the slurry to a hydrocyclone.

4 Claims, No Drawings

PROCESS FOR CENTRIFUGAL SEPARATION OF MATERIAL

This application claims benefit of Provisional Application 60/010,942 filed Jan. 31, 1996.

BACKGROUND OF THE INVENTION

1. Field of the Invention

The present invention concerns a process for centrifugal separation of materials contained in a liquid slurry. More specifically, the invention concerns such a process wherein the slurry includes a light material having a specific gravity that is less than the liquid carrier and a heavy material having a specific gravity that is greater than the liquid carrier. A gas, preferably air, is injected into the slurry prior to feeding the slurry to a hydrocyclone, resulting in an enhanced degree of separation of the light and heavy materials.

2. Description of Related Art

Hydrocyclones have been employed for many years to separate solid materials of differing specific gravity from liquid slurries. Separation of light particles from slurries has been enhanced in the past by adjusting the specific gravity of the liquid carrier by addition of salts. However, this results in increased cost and environmental concerns.

In the paper industry, a variety of reverse centrifugal cleaning methods have been used to remove good paper fibers from contaminants of closely similar or lower specific gravities. A discussion of reverse centrifugal cleaning is provided in Seifert et al., U.S. Pat. No. 4,155,839 and Bliss U.S. Pat. No. 4,565,443.

It has been found that enhanced separation of light and heavy particles from a slurry containing light particles having a specific gravity that is less than the liquid carrier and heavy particles having a specific gravity that is greater than the liquid carrier is achieved by injection of air into the slurry upstream of the hydrocyclone. The process does not require modification of the hydrocyclone apparatus and, as a result of the increased efficiency of separation of the heavy and light components, reduces the number of passes required to achieve a high degree of separation.

SUMMARY OF THE INVENTION

The process of this invention relates to separating a first material from a second material in a hydrocyclone, comprising the steps of: a) providing a slurry of the first and second materials in a liquid carrier, wherein the liquid carrier has a specific gravity less than the specific carrier of the first material and greater than the specific gravity of the second material; b) injecting a gas into the slurry to aerate the slurry prior to feeding the slurry into the hydrocyclone; c) feeding the aerated slurry into the hydrocyclone to separate the first material from the second material; and d) collecting the separated first material and second material.

Preferably, air is used as the gas which is injected into the slurry and the liquid carrier is water. In one embodiment, the first material comprises a polyamide and the second material comprises polypropylene. Preferably, the polyamide is either nylon 66 or nylon 6.

DESCRIPTION OF THE INVENTION

The process of the current invention is useful in the separation of solid materials contained in a liquid slurry wherein one of the materials has a specific gravity that is less than that of the liquid carrier and another of the materials has a specific gravity that is greater than that of the liquid carrier. The process involves injection of a gas into the slurry prior to feeding the slurry to a hydrocyclone.

Any gas may be used which does not react with the slurry components. A preferred gas is air, which is generally inert and readily available at low cost. The gas is introduced into the slurry upstream of the hydrocyclone. Air may be conveniently introduced via a pump that is used to pump the slurry to the hydrocyclone. However, the resulting cavitation generally causes premature deterioration in pump performance. Alternate methods for introducing air into the slurry include use of static or dynamic mixers upstream of the hydrocyclone.

The air should be introduced at sufficient flow rate to aerate the slurry. It is important that the air is well dispersed in the liquid stream in very small bubbles when the slurry enters the hydrocyclone, hence the need to inject into the pump or the use of in-line mixer. Preferably the air is introduced a short distance upstream of the hydrocyclone to minimize dissipation of the air bubbles. Alternatively, dynamic mixers can be used to maintain the aerated condition of the slurry. The optimum air flow will be dependent upon the nature and flow rate of the feed slurry and can be determined experimentally by varying the air flow rate and observing the degree of separation of the light and heavy components. It has been found that approximately 12 cf/hr (5.7 l/min) or greater provides good results for 40 gal/min (2.52 liter/sec) of a slurry containing 0.2 to 0.5 weight percent solids. Generally, the absence of a foam in the reject stream may be an indication that the air flow is too low.

Using the process of the current invention, conventional operating conditions such as slurry flow rate, back pressure and pressure drop are used. These parameters are adjusted, as known in the art, to obtain optimum separation of the various components.

The mechanism of how the improvement in separating the first material from the second material is achieved using the process of the current invention has not been established. However, the effect is opposite of that expected based on a reduction of the density of the liquid carrier via aeration. It is possible that the air migrates rapidly to the center of the hydrocyclone and carries the lighter component with it, thus enhancing the degree of separation from the heavier component.

The process of the current invention has been found to be particularly useful in the recycling of post-consumer carpets in processes where the carpets are size-reduced to liberate the various components into discrete particles. In a post-consumer carpet there are generally three predominant components: backing, face fiber, and backcoating materials. The lightest of these components is generally polypropylene, which is present in the primary and secondary backing of most carpets. Polypropylene carpet backing is generally in the form of woven ribbons or nonwoven fabric. In addition, polypropylene is increasingly being used as the face fiber. Other common face fibers include nylon and polyester, which are of intermediate density. Backcoating compositions generally contain the heaviest components, including binders such as latex and fillers (grit) such as calcium carbonate.

The process of the current invention is especially useful in the recycling of nylon face fiber post-consumer carpets. The carpets must first be converted to a form that can be slurried and processed in a hydrocyclone. It is generally desirable to first sort the carpets by face fiber type. Carpets of like polymer face fiber (e.g. nylon 66 or nylon 6) are then size-reduced by suitable means, e.g. with a hammermill, to pieces suitable for further size-reduction, After sifting to remove filled binder and loose dirt, the remaining fibrous product is further size-reduced, such as with a cutter, to reduce the fibrous material to a particle size such that it passes through a screen with holes less than or equal to about 0.125 in (0.32 cm). The resultant product includes material from the face (e.g. nylon 66 or nylon 6) and backing (e.g. polypropylene) layers of the carpet and any residual backcoating material that was not removed previously. This resultant product is then slurried in the liquid carrier, e.g. water. In one embodiment of the current invention, nylon (first material) is separated from polypropylene (second material) with water being used as the liquid carrier. The density of nylon is generally about 1.2 g/cm3 which is greater than the density of water (1 g/cm3) which is greater than the density of polypropylene (about 0.9 g/cm3). It is understood that the density of the first and second materials will depend on the crystallinity and processing of said materials. In the separation of nylon 66 from polypropylene, it is preferable to heat the slurry to temperatures of at least 105 deg F., with a temperature of 140 deg F. giving especially good separation.

It has been found that the process of the current invention improves efficiency of separation of polypropylene from nylon so that, for example, two 3 inch X-clones (manufactured by Black Clawson Company, Middletown, Ohio) in series reduces polypropylene content to less than 2%. This level of purity necessitated up to five X-clones in series without air injection.

It should be noted that the results of separation will vary greatly depending upon the feedstock used. If the nylon and polypropylene fibers are more liberated from the backing and the latex, separation is easier and contamination is less likely.

The separated components may be recycled into separate end-uses. For example, the nylon 66 component from carpet recycling can be remelted for use in the manufacture of automobile components. Alternatively, materials such as nylon 6 or nylon 66 may be further processed into monomeric or oligomeric components via chemical recycling. The purified monomers or oligomers can then be repolymerized for reuse in carpet fibers or other end-use applications.

EXAMPLES

A test was run to demonstrate the effect of air injection on the efficiency of separation of nylon and polypropylene fibers in a wet hydrocyclone separation process. Two Black Clawson hydrocyclones were used in series. The feedstock used was a controlled sample of post-industrial carpet containing only nylon 6,6 and polypropylene fibers (no latex or calcium carbonate). The feedstock contained 77.1 weight percent nylon 6,6 and 22.9 weight percent polypropylene. The air injection flow rate, in cubic feet per minute, was varied as shown in Table 1. The water flow rate was held constant at 400 gallons per minute. The temperature was controlled in the range of 130 to 135° F. The results are given in Table 1 as percent polypropylene contamination in the separated nylon 6,6 fraction.

TABLE 1

|  | Air flow, cfm | % polypropylene |
|---|---|---|
| Control | 0.0 | 1.01 |
| Example 1 | 1.2 | 0.71 |
| Example 2 | 2.6 | 0.40 |
| Example 3 | 3.8 | 0.62 |

The best results were seen in Example 2, wherein 2.6 cubic feet per minute air injection resulted in a 60 percent reduction in polypropylene contamination as compared with no air injection.

What is claimed is:

1. A process for separating a polyamide material from a polypropylene material in a hydrocyclone comprising the steps of:

a) providing a slurry of said polyamide and polypropylene materials in a liquid carrier, said liquid carrier being selected to have a specific gravity that is less than the specific gravity of said polyamide material and greater than the specific gravity of said polypropylene material;

b) injecting a gas into said slurry to aerate said slurry prior to feeding said slurry into the hydrocyclone;

c) directly after aeration, feeding said aerated slurry into the hydrocyclone to separate said polyamide material from said polypropylene material; and d) collecting the separated polyamide and polypropylene materials.

2. The process of claim 1, wherein said gas comprises air.

3. The process of claim 2, wherein said liquid carrier consists essentially of water.

4. The process of claim 1, wherein the polyamide is either nylon 66 or nylon 6.

* * * * *